(12) United States Patent
Dornhof

(10) Patent No.: US 7,268,502 B2
(45) Date of Patent: Sep. 11, 2007

(54) METHOD AND ARRANGEMENT FOR CONTROLLING THE SYNCHRONOUS RUNNING OF A PLURALITY OF ELECTRONICALLY COMMUTATED MOTORS

(75) Inventor: Konstantin Dornhof, Immendingen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 0 days.

(21) Appl. No.: 11/295,935

(22) Filed: Dec. 6, 2005

(65) Prior Publication Data

US 2006/0125431 A1    Jun. 15, 2006

(30) Foreign Application Priority Data

| Dec. 11, 2004 | (DE) | ................... | 10 2004 059 752 |
| Jun. 1, 2005 | (DE) | ................... | 10 2005 026 673 |
| Oct. 22, 2005 | (DE) | ................... | 10 2005 051 468 |

(51) Int. Cl.
*H02P 5/46* (2006.01)

(52) U.S. Cl. .................. 318/85; 318/72; 318/138; 318/254; 318/439; 318/599

(58) Field of Classification Search .................. 318/85, 318/72, 138, 254, 439, 268, 34; 310/192, 310/193, 172; 388/804, 806; 378/599, 609, 378/634, 685, 700; 218/717
See application file for complete search history.

(56) References Cited

U.S. PATENT DOCUMENTS

| 3,873,897 | A |   | 3/1975 | Muller et al. .............. 318/138 |
| 3,967,170 | A | * | 6/1976 | MacDonald et al. .......... 318/85 |
| 5,845,045 | A |   | 12/1998 | Jeske et al. ................. 388/804 |
| 6,037,765 | A |   | 3/2000 | Sager et al. ................. 324/166 |
| 6,091,887 | A |   | 7/2000 | Dieterle et al. ............. 388/811 |
| 6,831,431 | B1 |  | 12/2004 | Dieterle et al. ............. 318/268 |
| 2002/0024305 | A1 | | 2/2002 | Itoh et al. ..................... 318/34 |

FOREIGN PATENT DOCUMENTS

EP    1 178 598 A2    2/2002

(Continued)

OTHER PUBLICATIONS

Patent Abs. of Japan, English abstract of JP 2004-015980-A, Okubo et al. publ. Jan. 14, 2004.

(Continued)

*Primary Examiner*—Karen Masih
(74) *Attorney, Agent, or Firm*—Milton Oliver, Esq.; Ware Fressola Van Der Sluys & Adolphson LLP

(57) ABSTRACT

A method of controlling synchronous running of a plurality of electronically commutated motors (22, 24, 26), each of which includes a stator having a stator winding (40, 42, 44), a permanent-magnet rotor (28, 30, 32), and at least one arrangement (34, 36, 38), associated with the respective motor, for sensing its rotor position and for generating a rotor position signal (H1, H2, H3). Also provided is an energization arrangement (46), to which the stator windings (40, 42, 44) of the motors are connected. The method includes the steps of detecting occurrence of a predetermined state of the rotor position signals (H1, H2, H3) and, in response thereto, triggering simultaneously commutation of the currents in all the motors.

18 Claims, 11 Drawing Sheets

FOREIGN PATENT DOCUMENTS

JP  2003-166294 A  4/2003
JP  2004-0 15 980 A  1/2004

OTHER PUBLICATIONS

Machine translation into English of JP 2004-015980-A (13 pp.) and drawing Figs. 1-9.

Microchip Technology, Inc, Chandler AZ, . PIC12F629/675 Data Sheet, © 2003, pp. 1-130.

Allegro MicroSystems, Inc. UGN3275K Compl. Output Hall-Effect Latch datasheet, © 2005, pp. 1-4.

Patent Abs. of Japan, English abstract of JP 2003-116294, Matsuda, publ. Apr. 18, 2003.

* cited by examiner

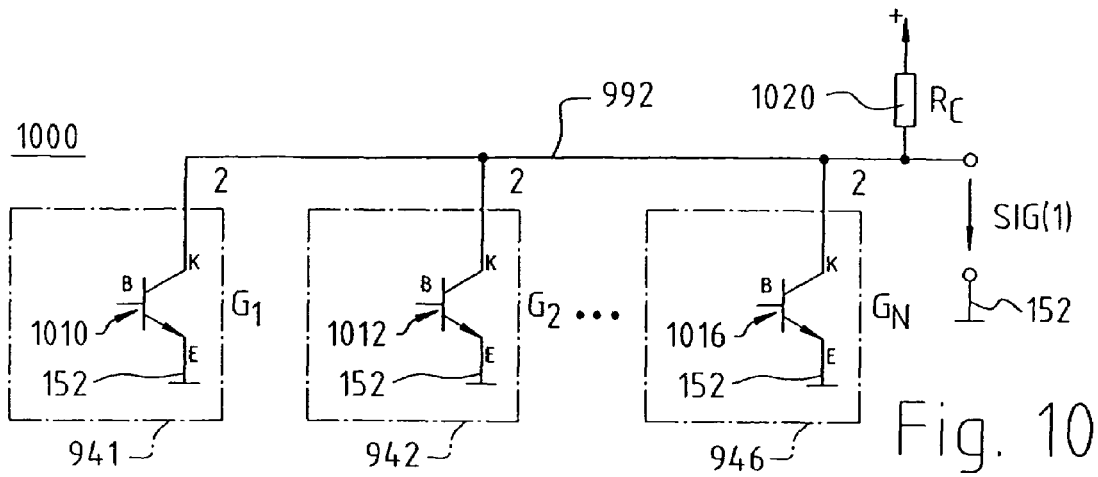
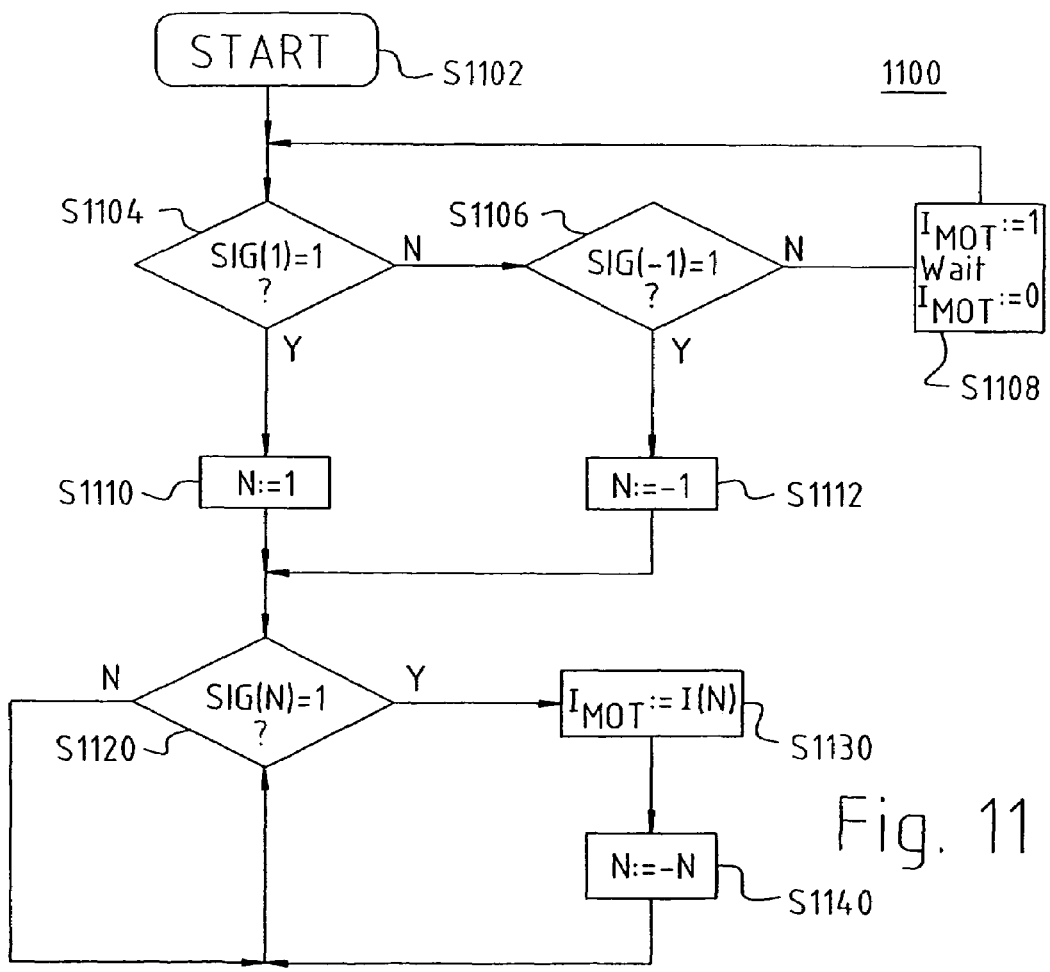

METHOD AND ARRANGEMENT FOR CONTROLLING THE SYNCHRONOUS RUNNING OF A PLURALITY OF ELECTRONICALLY COMMUTATED MOTORS

CROSS-REFERENCE to related non-patent literature, which is hereby incorporated by reference: PIC12F675 microcontroller datasheet, Microchip Technology, Inc., Chandler, Ariz., USA; UGN3275K Hall sensor datasheet, Allegro Microsystems, Inc., Worcester, Mass., USA.

FIELD OF THE INVENTION

The invention relates to a method and an arrangement for controlling the synchronous running of a plurality of electronically commutated motors. A "plurality" means that at least two motors are running synchronously with one another.

BACKGROUND

In many cases, it is necessary for a plurality of electronically commutated motors to rotate at the same speed. In such a case, each motor usually has its own electronics system, e.g. for controlling the currents in its stator winding arrangement, and a computer is provided which centrally controls these various electronic systems and suppresses deviations in speed. High costs for corresponding hardware arise in this context, however, and interference noise occurs if the motors do not run in exactly synchronous fashion, especially when those motors are driving gearboxes.

SUMMARY OF THE INVENTION

It is therefore one object of the invention to provide a method and an arrangement for synchronous running of electronically commutated motors with lower hardware/software costs than in prior art systems.

According to the invention, this object is achieved by a method in which sensing of rotor positions in the respective motors triggers simultaneous control signals to commutate all of the motors. It is also achieved by an arrangement in which sensing, that the rotor of each motor is within a predetermined rotor position range approximately one rotor pole wide, triggers the commutation signals. "Synchronous running" is understood here to be a synchronization, if applicable, also at a predetermined ratio among the speeds of individual motors, e.g. a 1:1, 1:2, 1:3 or other ratio.

BRIEF FIGURE DESCRIPTION

Further details and advantageous refinements of the invention are evident from the exemplifying embodiment, in no way to be understood as a limitation of the invention, that is described below and depicted in the drawings.

FIG. 10 is a circuit diagram showing a wired AND linkage of gates having open collector outputs;

FIG. 11 is a flow chart to explain a method according to the invention; and

DETAILED DESCRIPTION

Figure 1:
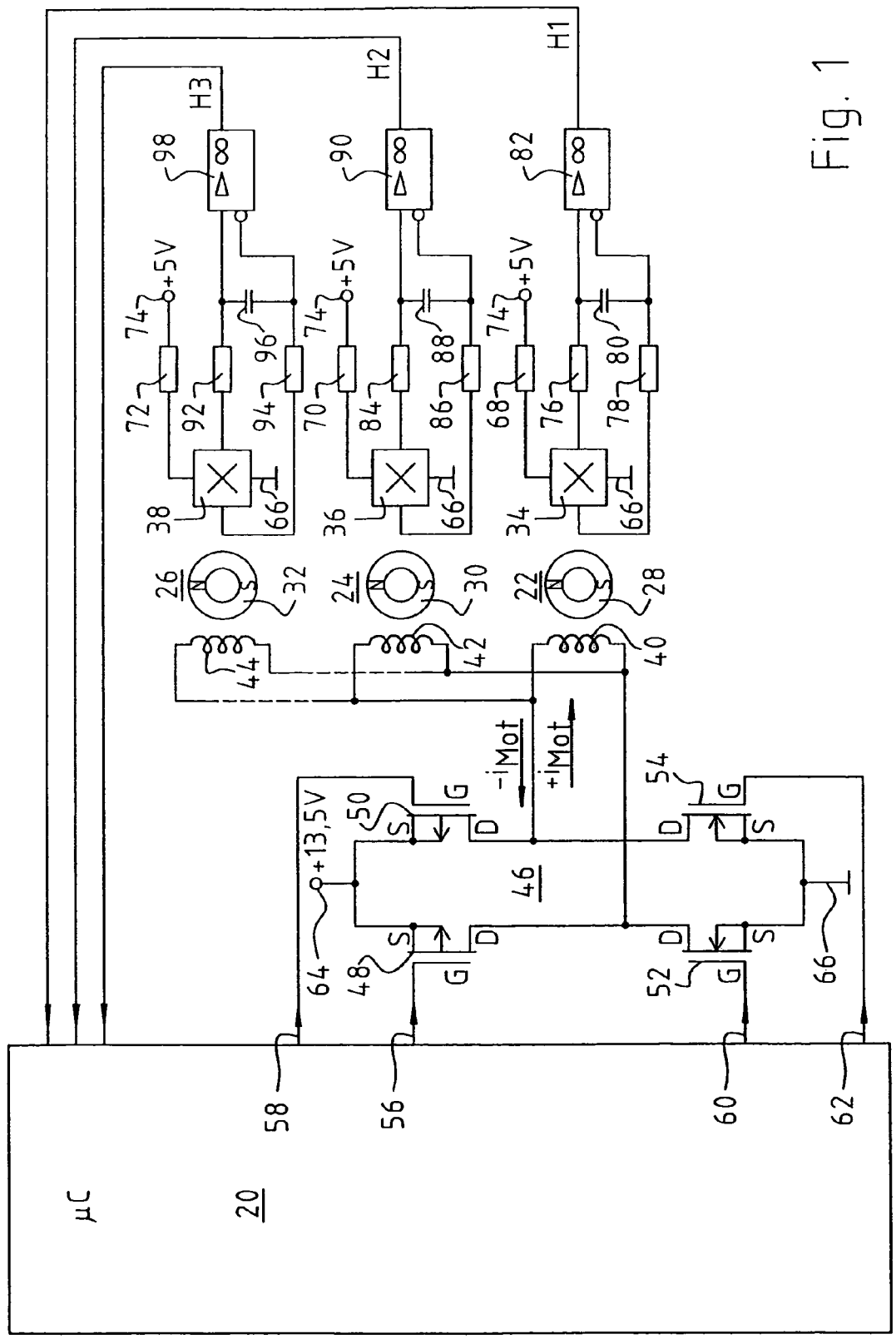
FIG. 1 is a circuit diagram to explain a preferred embodiment of an arrangement according to the present invention.

FIG. 1 shows at the left a μC 20 that serves to control the combined energization of three electronically commutated motors (ECMs) 22, 24, 26. The invention is of course also suitable for controlling a different number of motors, in which context the power section must of course be designed differently depending on the number of motors. Each motor has a respective permanent-magnet rotor 28, 30, 32, associated with which is a respective rotor position sensor 34, 36, 38 that is depicted as a Hall sensor, since Hall sensors are most commonly used in ECMs. Sensors of any kind can be used, however; they should preferably be of identical construction in order to simplify the arrangement. A sensing of the rotational position via the so-called sensorless principle is also possible.

Each ECM 22, 24, 26 furthermore has a respective stator winding arrangement 40, 42, 44, which is depicted here as a single-phase winding. These three windings are wired in parallel in this example, and are connected to the output of an H bridge 46 that has as the upper transistors two p-channel MOSFETs 48, 50, and as the lower transistors two n-channel MOSFETs 52, 54. Alternatively, windings 40, 42, 44 could also be connected in series; and in the version according to FIG. 4, for example, two windings can be connected in series and the two series circuits can be connected in parallel with one another.

Gates G of upper transistors 48, 50 are connected to two respective outputs 56, 58 of μC 20, and gates G of lower transistors 52, 54 are connected to two respective outputs 60, 62. Drains D of left transistors 48, 52 are connected to one another and to the upper terminals of windings 40, 42, 44. Source terminals S of upper transistors 48, 50 are connected to a positive terminal 64, e.g. to +13.5 V as depicted. Drains D of right transistors 50, 54 are connected to one another and to the lower terminals of windings 40, 42, 44. Source terminals S of lower transistors 52, 54 are connected to ground 66.

When the two MOSFETs 50, 52 are made conductive by μC 20, a positive current +iMOT flows to the three windings 40, 42, 44; and when transistors 50, 52 are blocked and transistors 48 and 54 are instead conductive, a current −iMOT flows. Motors 22, 24, 26 are depicted as two-pulse motors, i.e. a current +iMOT flows during a rotor rotation from approximately 0 degrees el. to 180 degrees el., and a current −iMOT flows during the subsequent rotation from approximately 180 to 360 degrees el., as is common knowledge to one skilled in the art. This invention is of course not limited to this two-pulse motor design, but rather is suitable in principle for all types of electronically commutated motors.

Hall sensors 34, 36, 38 each receive their operating current, via a respective resistor 68, 70, 72, from a source 74 having a regulated voltage of +5 V. The outputs of sensor 34 are connected via two resistors 76, 78 and a filter capacitor 80 to the inputs of an operational amplifier 82 at whose output, during operation, a square-wave signal H is obtained that is depicted in FIG. 3 and is delivered to μC 20.

In the same manner, sensor 36 is connected via two resistors 84, 86 and a capacitor 88 to an operational amplifier 90, at whose output a signal H2 is obtained that is delivered to μC 20.

In the same manner, sensor 38 is connected via two resistors 92, 94 and a capacitor 96 to an operational amplifier 98, at whose output a signal H3 is obtained that is delivered to μC 20.

Figure 3:
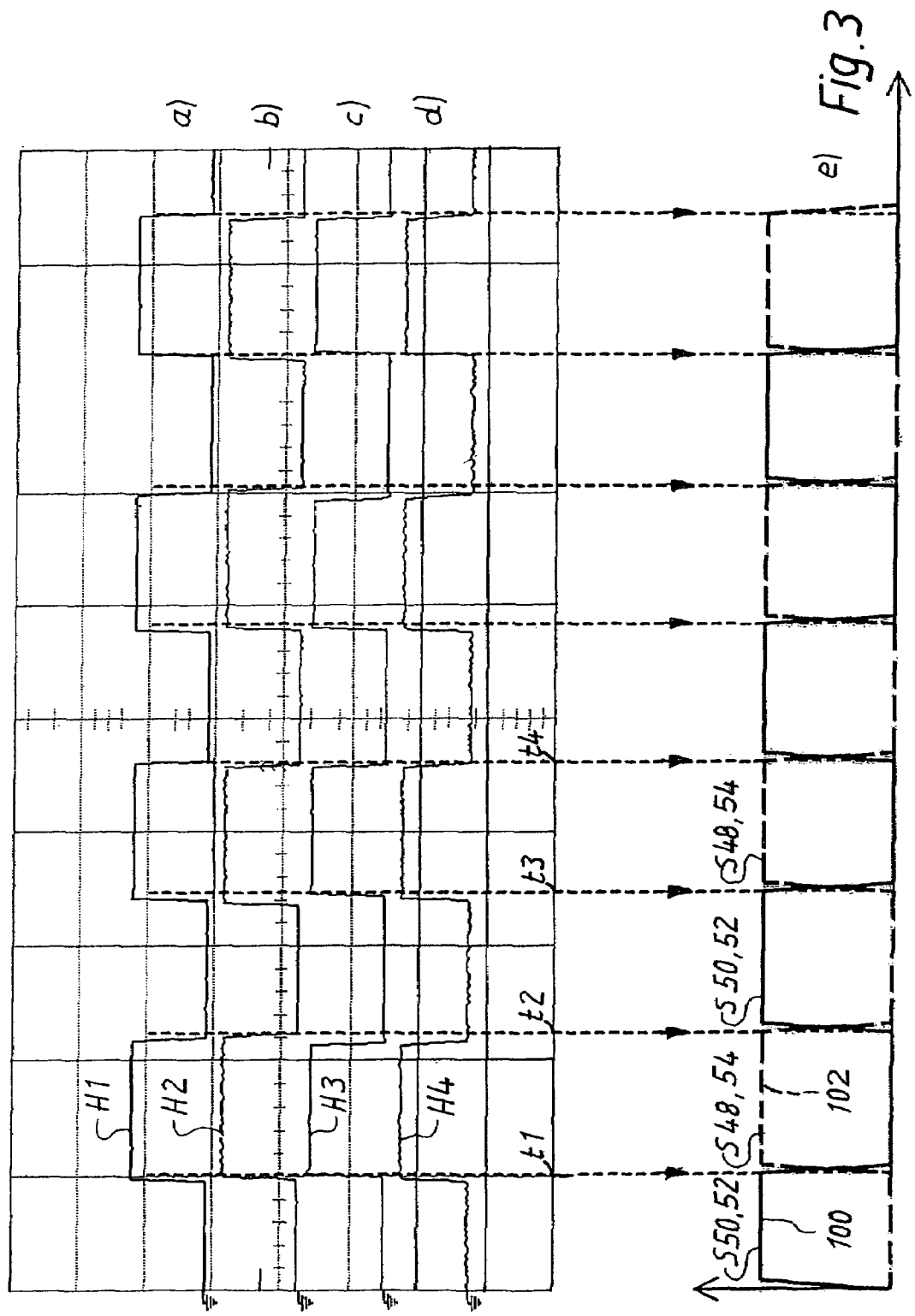
FIG. 3 is a schematic depiction to explain the manner of operation of the invention.

FIG. 3 shows signals H1 to H3 and their evaluation. As is evident from FIG. 3, the current in all motors 22, 24, 26 is commutated simultaneously upon the occurrence of a predetermined state of signals H1 to H3. According to a preferred embodiment of the invention, this predetermined state occurs whenever all rotors 28, 30, 32 exhibit a rotor position in a predetermined rotor position range that approximately corresponds, for each motor, to one pole width of the respective permanent-magnet rotor 28, 30, 32. The predetermined state is preferably defined by the fact that all Hall sensors 34, 36, 38 are generating a predetermined rotor position signal (e.g. "HIGH"). In this context, the last signal change of one of the three sensor signals always causes a commutation. At point t1, for example, signal H3 is the last to change from "LOW" to "HIGH," and therefore causes a commutation from −iMOT to +iMOT. Synchronous running of the three motors 22, 24, 26 is thereby effected in very simple fashion.

Figure 2:
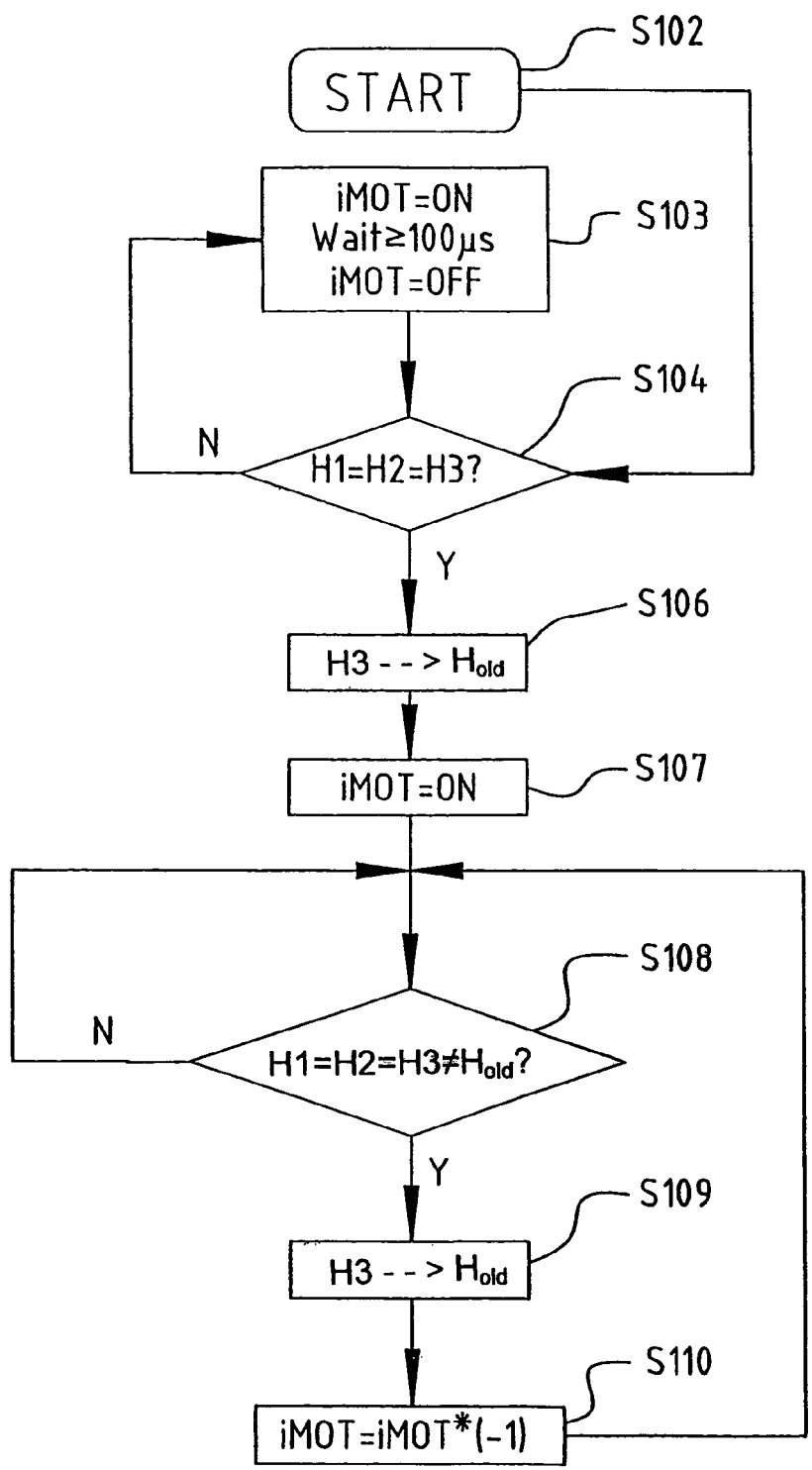
FIG. 2 is a flow chart to explain a method according to the invention.

FIG. 2 shows the corresponding flow chart. Operation starts at S102, and in S104 μC 20 then queries whether H1=H2=H3. If not, windings 40, 42, 44 are energized once together, for example within a time span of 100 μs or more, in order to rotate all rotors 22, 24, 26 into approximately the same starting position and thereby to achieve matching values for signals H1, H2, and H3.

If that is the case, then in S106 the value for H3 is saved as H$_{old}$, and in S107 the energization of windings 40, 42, 44 with a current of the correct direction, i.e. with either +iMOT or −iMOT, is switched on.

In S108 a continuous check is then made as to whether all signals H1, H2, H3 have changed in value, i.e. whether they have a value different from the value H$_{old}$ previously saved in S106. If Yes, then in S109 the new value of H3 is saved as H$_{old}$, and in S110 the motor current iMOT is commutated in accordance with the value in H$_{old}$. If No, the program goes back and cycles through S108 again.

After commutation (in S110), the program goes back to S108 and the operations just described continuously repeat.

Synchronous running of motors 22, 24, 26 with little effort is achieved in this fashion.

Figure 4:
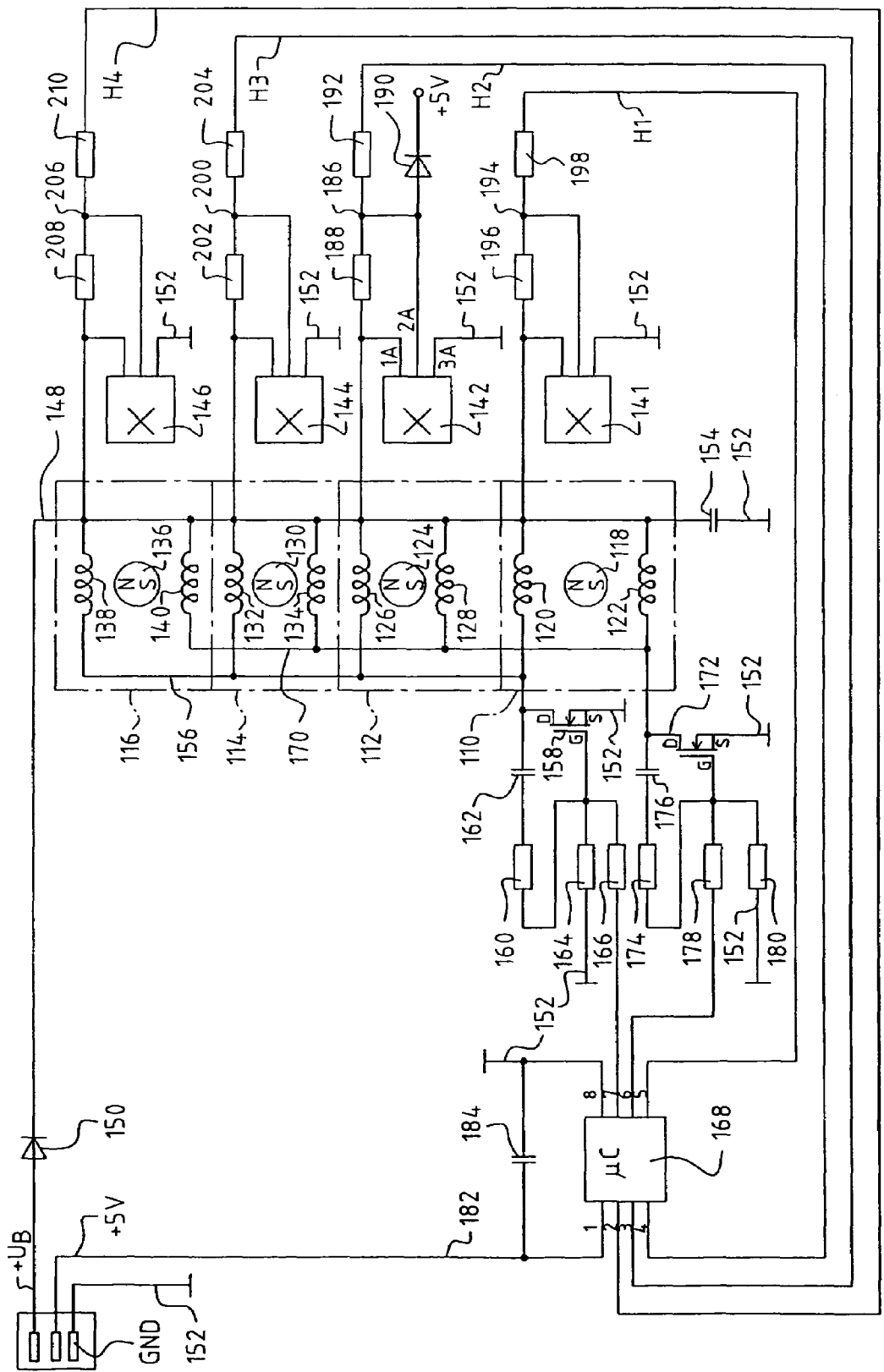
FIG. 4 is a circuit diagram showing application to the synchronization of four two-phase, two-pulse motors.

FIG. 4 shows an example with four electronically commutated motors 110, 112, 114, 116. Motors 22, 24, 26 according to FIG. 1 are motors having only one winding phase 40, 42, 44, which are therefore referred to as single-phase, two-pulse motors because as a result of the single winding phase (e.g. phase 40) and with the use of a two-pole rotor 28, two current pulses flow in them for each rotor rotation of 360 degrees mech. (=360 degrees el.).

Motors 110 to 116, on the other hand, are two-phase, two-pulse motors, which makes the electronics simpler and cheaper as compared with FIG. 1 but reduces the copper space factor. Nothing changes in terms of the manner of operation of the motor, i.e. the forces acting on a rotor are the same as in FIG. 1.

Motor 110 has a two-pole permanent-magnet rotor 118 and two winding phases 120, 122. Motor 112 has a rotor 124 and two winding phases 126, 128. Motor 114 has a rotor 130 and two winding phases 132, 134. Motor 116 has a rotor 136 and two winding phases 138, 140. Each motor furthermore has a respective Hall IC 141, 142, 144, 146. Hall sensor 141 is controlled by the magnetic field of rotor 118, sensor 142 by rotor 124, sensor 144 by rotor 130, and sensor 146 by rotor 136.

The right-hand terminals of all eight winding phases 120, 122, 126, 128, 132, 134, 138, 140 are connected via a line 148 and a diode 150 to a voltage UB, e.g. to +24 V. Diode 150 is a so-called "mispolarization diode," which implements mispolarization protection and thus prevents the motor from being connected with incorrect polarity. Located between line 148 and ground 152 is a capacitor 154 that, in operation, supplies reactive power for the four motors 110 to 116.

The left-hand terminals of the four upper phases 120, 126, 132, 138 are connected via a line 156 to drain terminal D of an n-channel MOSFET 158 whose source S is connected to ground 152. Its gate G is connected to drain D via the series circuit of a resistor 160 and a capacitor 162. Gate G is further connected via a resistor 164 to ground 152 and via a resistor 166 to an output 7 of a microcontroller (μC) 168. MOSFET 158 is therefore controlled by μC 168.

The left-hand terminals of lower phases 122, 128, 134, and 140 are connected via a line 170 to drain D of an n-channel MOSFET 172 whose source S is connected to ground 152. An RC combination 174, 176 is located between gate and drain. Gate G is also connected via a resistor 178 to an output 6 of μC 168, and via a resistor 180 to ground 152. MOSFET 172 is therefore also controlled by μC 168.

μC 168 receives, via a line 182, a regulated DC voltage of +5 V at its input 1, and its input 8 is connected to ground (GND) 152. A filter capacitor 184 is located between ground 152 and line 182.

The circuitry of Hall ICs 141, 142, 144, 146 is largely identical. They are each connected at a terminal 3A to ground 152, and are connected at a terminal 1A to line 148, i.e. to +UB. Terminal 2A is an output having an open collector, and a collector resistor 188 is therefore associated with it.

Terminal 2A is connected to a node 186 that is connected via resistor 188 to terminal 1A of Hall sensor 142 and to line 148. Node 186 is furthermore connected via a diode 190 to a regulated voltage of, for example, +5 V, and via a resistor 192 to an input 3 of μC 168.

Diode 190 is provided in this case in order to limit the voltage at point 186, since input 4 of μC 168 is the so-called "master pin" at which an internal protective diode is not present, whereas processor inputs 2, 3, and 6 have internal protective diodes. (Input 4 also serves for programming of processor 168.)

Hall sensor 141 likewise has a node 194 that is connected via a resistor 196 to line 148 and via a resistor 198 to input 5 of μC 168.

Hall sensor 144 likewise has a node 200 that is connected via a resistor 202 to line 148 and via a resistor 204 to input 3 of μC 168.

Hall sensor 146 likewise has a node 206 that is connected via a resistor 208 to line 148 and via a resistor 210 to input 2 of μC 168.

In operation, four Hall signals H1 to H4 are delivered to μC 168 and are processed using an algorithm that corresponds to the flow chart of FIG. 2. For example, when H1=H2=H3=Hy4=1, MOSFET 158 is switched on and MOSFET 172 is switched off, so that a current flows through the four winding phases 120, 126, 132, and 138.

When H1=H2=H3=H4=0, MOSFET 158 is then switched off and MOSFET 172 is switched on, so that a current flows through the four phases 122, 128, 134, and 140.

During one half-revolution of rotors 118, 124, 130, 136 a current therefore flows through the four phases 120, 126, 132, and 138, and during the other half-revolution a current flows through the other four phases 122, 128, 134, and 140, with the result that the four motors 110, 112, 114, and 116 run synchronously. Alternatively, as already mentioned, the phases could optionally also be connected in series or in combined serial and parallel fashion.

It would also be possible, for example, to equip rotor 118 with four poles and the other three rotors 124, 130, and 136 with two poles. In that case rotor 118 runs at only half the speed of the other three rotors. In the same fashion, a six-pole rotor would run at one-third the speed.

A speed regulation system, likewise a so-called ignition angle shift function, a stall protection system that shuts off the motors if one of them stalls, a current limiter, etc. can additionally be provided in μC 168, as is known to one skilled in the art of electronically commutated motors.

Preferred Values of Components in FIG. 4

| | |
|---|---|
| μC 168 | PIC12F675 |
| MOSFETs 158, 172 | BUK98180 |
| Diode 150 | BAV20WS |
| Diode 190 | 1N4148 |
| C 162, 176 | 470 pF |
| C 184 | 100 nF |
| C 154 | 1 μF |
| R 166, 178, 188, 196, 202, 208 | 10 kOhm |
| R 160, 164, 174, 180 | 51 kOhm |
| R 192, 198, 204, 210 | 100 kOhm |

Many variants are, of course, possible. For example, instead of using Hall ICs 141 to 146, the rotor positions can also be sensed by means of the so-called sensorless principle, as will be explained below using examples. Bipolar transistors would also be possible instead of MOSFETs 158, 172, but corresponding driver transistors would then need to be provided.

Figure 5:
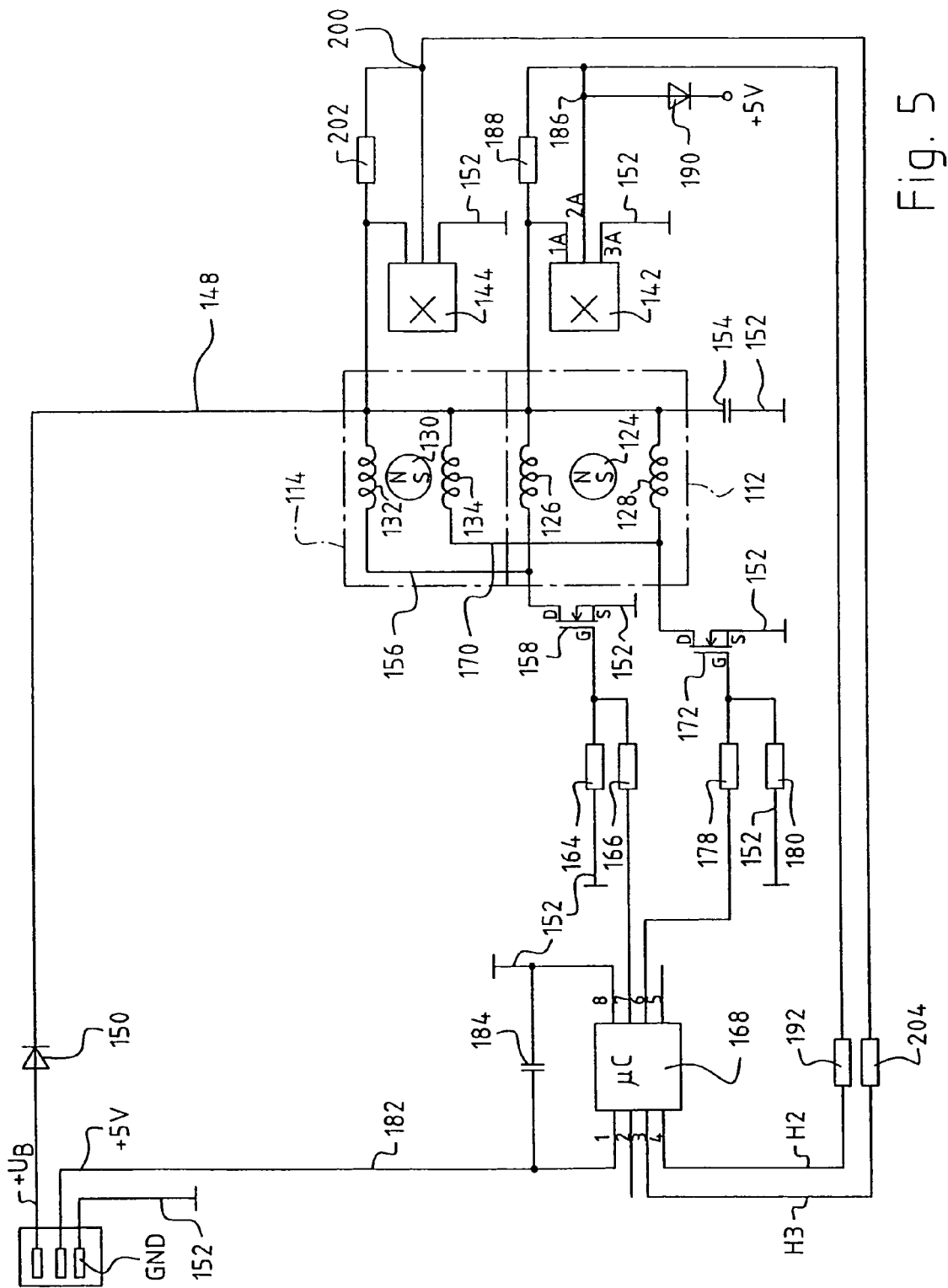
FIG. 5 is a slimmed-down version analogous to FIG. 4, in which only two motors 112, 114, each equipped with an associated Hall IC 142, 144, are used.

FIG. 5 shows a variant that represents, so to speak, a slimmed-down version of FIG. 4. Parts identical, or functioning identically, to those in FIG. 4 are therefore labeled with the same reference characters as therein and not described again.

FIG. 4 uses four motors 110, 112, 114, 116 that run synchronously. In FIG. 5 only two motors 112, 114 are used, which likewise run synchronously. The circuit otherwise corresponds to FIG. 4, and will therefore not be described further. For transistors 158, 172 the RC elements (160, 162 and 174, 176, respectively) of FIG. 4 are not depicted, but can likewise be used. Because the inductances to be switched here are smaller, these RC elements can in many cases be omitted.

The manner of operation corresponds to what was described with reference to FIGS. 2 and 3, except that only two Hall signals H2 and H3 are present. The values for the components correspond to those indicated for FIG. 4, and will therefore not be repeated.

Figure 6:
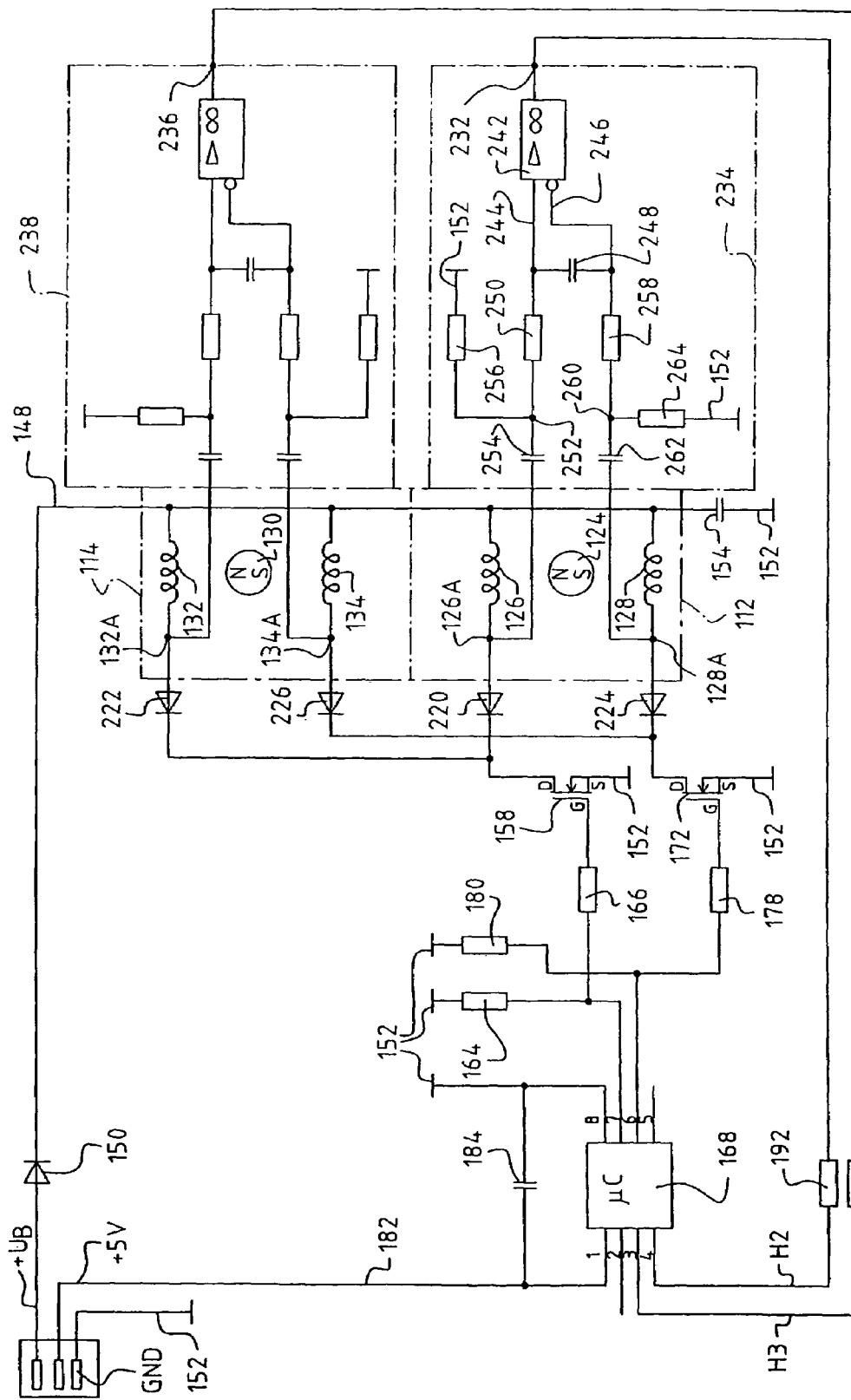
FIG. 6 is a circuit analogous to FIG. 5, in which the two motors have no rotor position sensor but operate according to the so-called sensorless principle.

FIG. 6 shows a circuit analogous to FIG. 5, in which motors 112, 114 are constructed identically to those in FIG. 5 as are the two FETs 158 and 172 and their driving system, with the result that the same reference characters as in FIG. 5 are used for these parts, and these corresponding parts and their function will not be described again in the interest of brevity.

Because in FIG. 6 the position of rotors 124, 130 is sensed without a separate sensor, it would not be possible to connect the windings as they are in FIG. 5 (windings 126 and 132 are connected in parallel in FIG. 5, as are windings 128 and 134). In FIG. 6, terminal 126A of winding 126 of motor 112 is therefore connected to the anode of a diode 220 whose cathode is connected to the drain of FET 158. In the same fashion, terminal 132A of winding 132 of motor 114 is connected via a diode 222 to the drain of FET 158. Similarly, terminal 128A of winding 128 of motor 112 is connected via a diode 224 to the drain of FET 172, and terminal 134A of winding 134 of motor 114 is connected via a diode 226 to the drain of FET 172.

In this fashion, the windings that were connected in parallel in FIG. 5 are electrically decoupled from one another by diodes 220 to 226, so that the voltages that occur at these windings during operation can be separately sensed and used to control the relevant motor. The circuits according to FIGS. 5 and 6 do not, however, differ as regards FETs 158, 172, i.e. when FET 158 becomes conductive, both windings 126 and 132 simultaneously receive current; and when FET 172 becomes conductive, both windings 128 and 134 simultaneously receive current.

FETs 158 and 172 are controlled (via μC 168) by a linkage of signals H2 and H3, which are delivered via respective resistors 192 and 204 to inputs 4 and 3, respectively, of μC 168. Signals H2 are supplied from output 232 of a sensorless box 234 whose two inputs are connected to terminals 126A, 128A of motor 112. Similarly, signals H3 are supplied from output 236 of a sensorless box 238 whose two inputs are connected to terminals 132A, 134A of motor 114.

Sensorless boxes 234, 238 are identical, and therefore only box 234 will be described. They are also identical to sensorless boxes 234, 238 used in FIG. 7.

Terminal 232 is constituted by the output of a comparator 242, whose non-inverting input is labeled 244 and whose inverting input is labeled 246. A filter capacitor 248 is located between these inputs. Input 244 is furthermore connected via a resistor 250, a node 252, and a capacitor 254 to terminal 126A, and node 252 is connected via a resistor 256 to ground 152.

Inverting input 246 is connected via a resistor 258, a node 260, and a capacitor 262 to terminal 128A, and node 260 is connected via a resistor 264 to ground 152.

Preferred Values of the Components

| | |
|---|---|
| Comparator 242 | TS3702 |
| C 248 | 1 nF |
| C 254, 262 | 22 nF |
| R 250, 256, 258, 264 | 100 kOhm |

Manner of Operation of Sensorless Box 234

Figure 8:
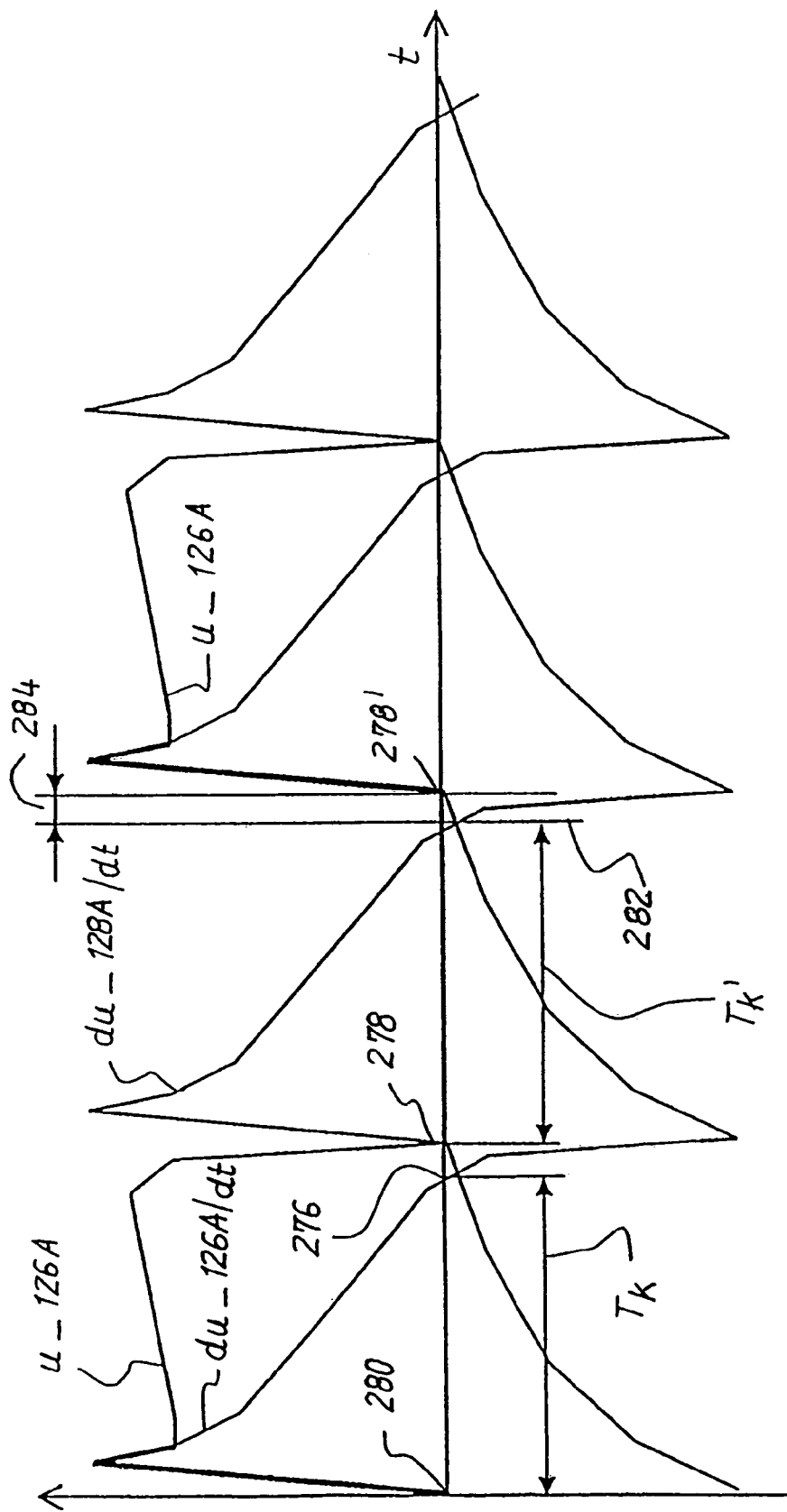
FIG. 8 is a diagram to explain the manner of operation of FIG. 6 and FIG. 7.

Reference is made here to FIG. 8, which shows a variety of electrical signals. u_126A is the induced voltage in phase 126 when the latter is currentless, and u_128A (not depicted) is, analogously, the voltage in the currentless phase 128.

Potential u_126A at terminal 126A of phase 126 is delivered to the differentiating element that is constituted by capacitor 254 and resistor 256. A differentiated voltage du_126A/dt is obtained at connecting point 252 of these two components, and can be adjusted, by appropriate selection of the components, in such a way that its zero transition 276 is located earlier in time than zero transition 278 of voltage u_126A (cf. FIG. 8).

Zero transition 276 can be evaluated in μC168 and used as a rotor position signal.

Simultaneously, time Tk since the previous zero transition 280 of induced voltage u_126A is also measured, and can optionally, as time Tk', control the next commutation.

In the same fashion, potential u_128A at terminal 128A of phase 128 is differentiated by the two components 262, 264, yielding the voltage du_128A/dt, i.e. the differential of the induced voltage at terminal 128A; that differential is delivered to input 246 of comparator 242, while voltage du_126A/dt is delivered to input 244.

When these two voltages become equal in value, comparator 242 changes its output signal. In FIG. 8 this is the case, for example, at point 282, and this point consequently precedes zero transition 278' of potential u_126A by an interval equal to time span 284, and can serve to control the commutation.

The two resistors 250, 258, as well as capacitor 248, act as two filters for the two inputs 244, 246 of comparator 242, and prevent high-frequency interference from causing an incorrect measurement.

The basic principle of this type of rotor position signal generation is therefore that the differential of a voltage induced in a currentless phase is used as a commutation criterion, and that this commutation criterion is evaluated as a rotor position signal.

Sensorless box 234 therefore generates a signal H2 that could also be referred to as a synthetic Hall signal, i.e. during operation it acts as such a signal. Signal H2 is also evaluated in the same way as a Hall signal, and as described in FIGS. 2 and 3. The same applies to signal H3 at output 236.

Figure 7:
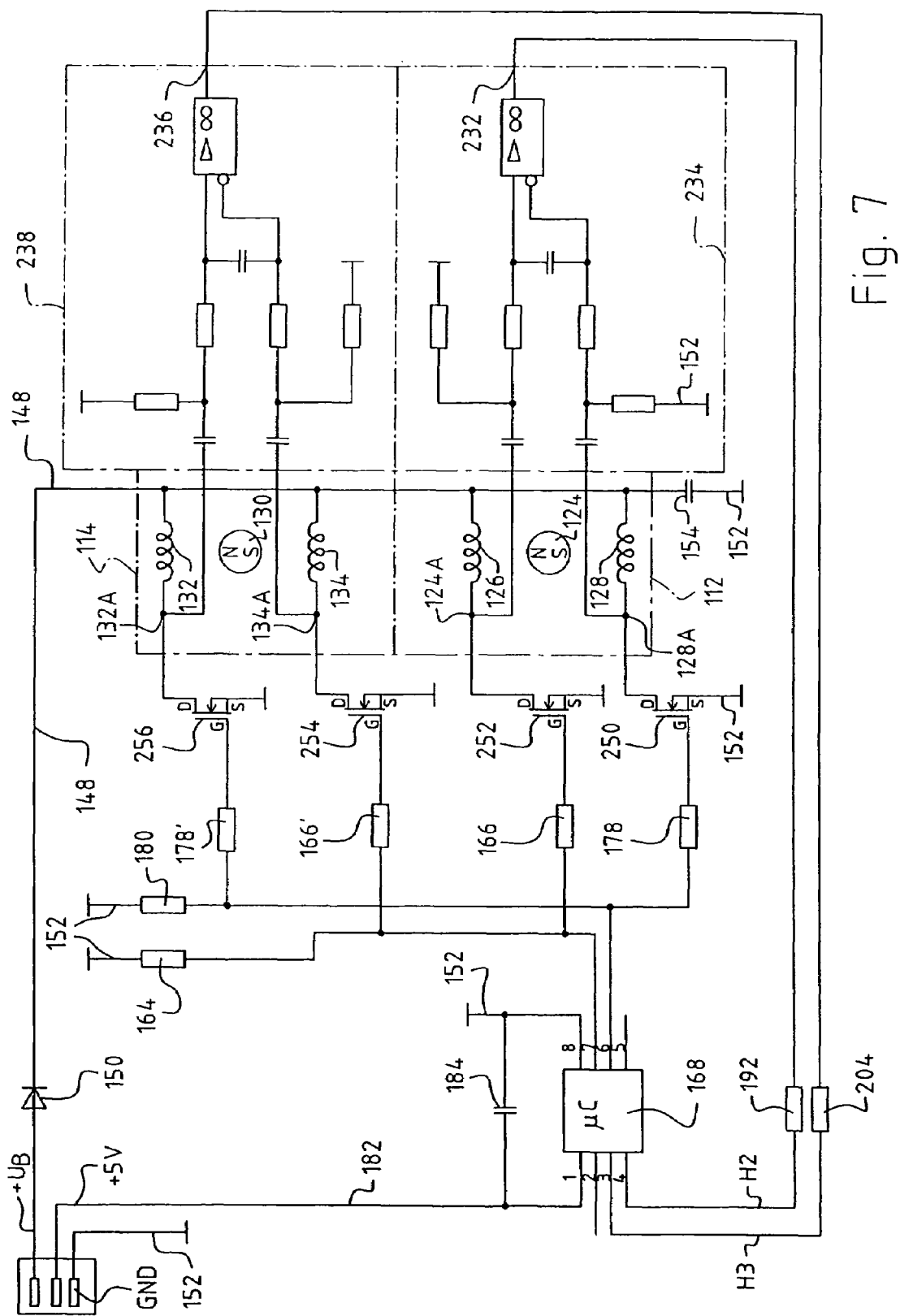
FIG. 7 is a variant of FIG. 6, likewise having two motors that operate according to the sensorless principle, except that four Field Effect Transistors (FET) are provided to drive the total of four motor windings, i.e. each winding is controlled by a separate transistor.

FIG. 7 differs from FIG. 6 in that diodes 220 to 226 of FIG. 6 are omitted and four FETs are provided in their place. An FET 250 controls the current in winding 128. This FET is controlled, via resistor 178, by output 6 of μC 168. An FET 252, which controls the current in winding 126, is controlled via resistor 166 by output 7 of μC 168.

An FET 254 is controlled via a resistor 166' by output 7 of μC 168, i.e. the two FETs 252 and 254 are synchronously switched on and off. An FET 256, which controls the current in winding 132, is driven via a resistor 178' by output 6 of μC 168, i.e. the two FETs 250 and 256 are switched on and off synchronously.

In this fashion, the individual windings of the two motors 112, 114 are once again reliably decoupled from one another, so that sensorless boxes 234 and 238 can work reliably. With regard to manner of operation, the reader is referred to the descriptions of FIG. 5 and FIG. 6.

Figure 9:
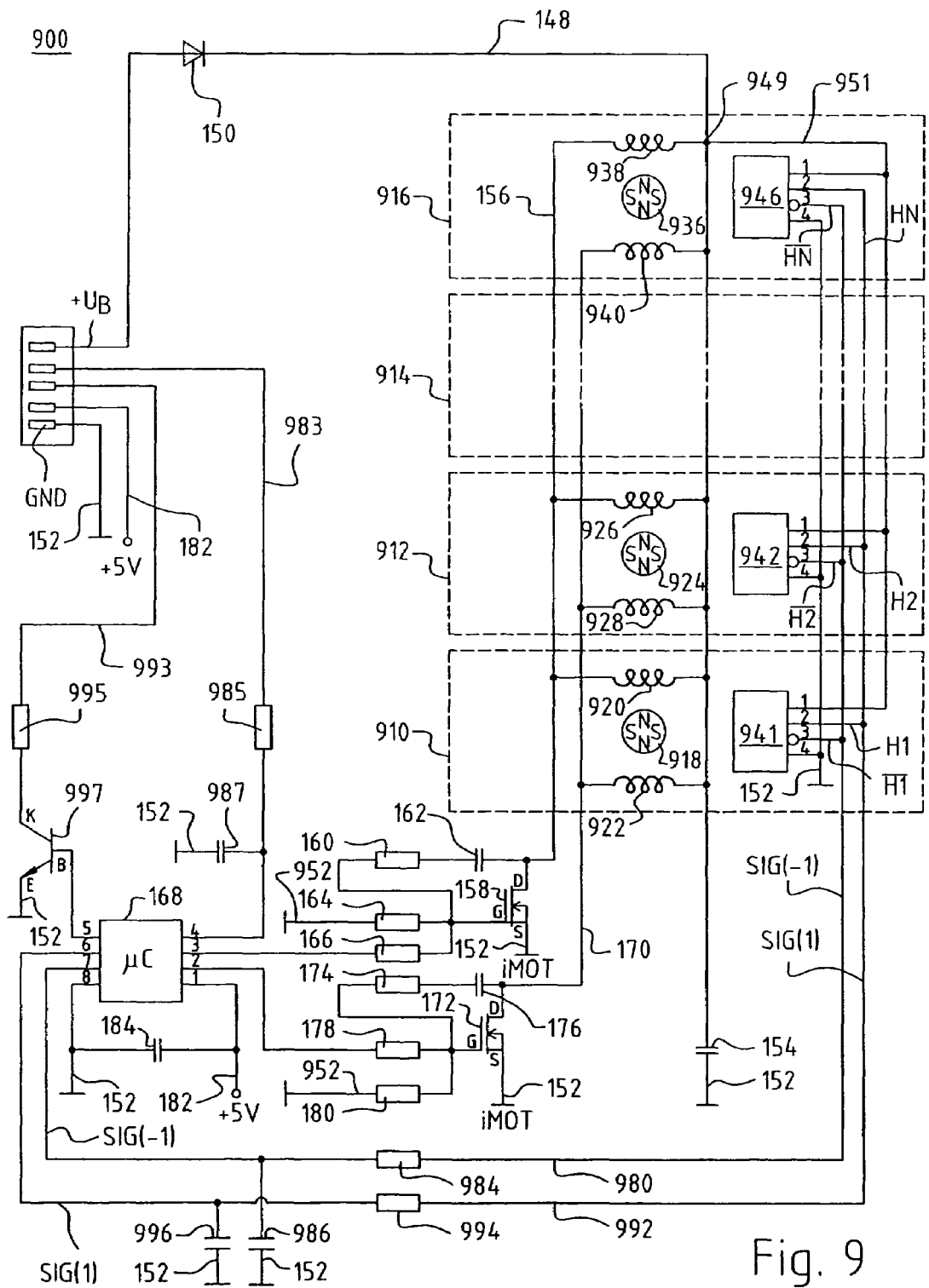
FIG. 9 is a circuit diagram showing application to the synchronization of a plurality of two-phase, two-pulse motors having four-pole permanent-magnet rotors.

FIG. 9 shows an example of an arrangement 900 having a plurality of components that correspond at least in part to components of FIG. 4. These corresponding components are not described further with reference to FIG. 9.

Arrangement 900 comprises a plurality of electronically commutated motors 910, 912, 916, which are depicted by way of example as two-phase, two-pulse motors having four-pole permanent-magnet rotors 922, 924, 926. Motor 910 correspondingly has a four-pole permanent-magnet rotor 918 and two winding phases 920, 922. Motor 912 has a rotor 924 and two winding phases 926, 928. Motor 916 has a rotor 936 and two winding phases 938, 940.

It should be noted that arrangement 900 can additionally comprise one or more other motors, as indicated by way of example at 914. These one or more other motors are preferably likewise embodied as two-phase, two-pulse motors having four-pole permanent-magnet rotors, and are interconnected in arrangement 900 in the same way as motors 910, 912, 916.

For the upper winding phases 920, 926, 938, the left terminals in each case are connected via line 156 to drain terminal D of n-channel MOSFET 158, whose source S is connected to ground 152. Gate G is connected via the series circuit of resistor 160 and capacitor 162 to drain D. Gate G is furthermore connected via resistor 164 to ground 152, and via resistor 166 to terminal 3 (switched here as an output) of microcontroller (μC) 168. MOSFET 158 is therefore controlled by μC 168.

μC 168 receives, via line 182, the regulated DC voltage of +5 V at its terminal 1, and its terminal 8 is connected to ground (GND) 152. Filter capacitor 184 is located between ground 152 and line 182.

It should be noted that μC 168 of FIG. 4 is used by way of example in arrangement 900. Terminals 1 to 8 of μC 168 are, according to the present invention, selectably utilizable by software as inputs or outputs, both as analog and as digital inputs or outputs, selectably with or without a pull-up resistor. As is evident from FIG. 4, some of terminals 1 to 8 of μC 168 are utilized as inputs, while others are utilized as outputs. In order to illustrate the selectable utilization of the terminals, selected terminals in FIG. 9 are connected or utilized differently than in FIG. 4. For example, terminal 3 is utilized (as described above) as an output in FIG. 9, whereas according to FIG. 4 it is utilized as an input. Terminal 5 of μC 168, utilized as an output, is connected to base terminal B of a bipolar transistor 997, whose emitter terminal E is connected to ground 152 and whose collector terminal K is connected via a resistor 995 to a line 993. Bipolar transistor 997 serves to generate an alarm signal that is outputted via line 993. Terminal 4 of μC 168, utilized as an input, is connected via a capacitor 987 to ground 152, and via a resistor 985 to a line 983. Via line 983, μC 168 can have delivered to it a preferably wattless signal that is smoothed by RC element 985, 987 and serves to switch arrangement 900 on and off.

The left-hand terminals of lower winding phases 922, 928, 940 are connected via line 170 to drain D of n-channel MOSFET 172, whose source S is connected to ground 152. The RC combination 174, 176 is located between gate and drain. Gate G is also connected via resistor 178 to terminal 2 (utilized as an output) of μC 168, and is connected via resistor 180 to ground 152. MOSFET 172 is therefore also controlled by μC 168.

The right-hand terminals of all winding phases 920, 922, 926, 928, 938, 940 are connected to a node 949 that is connected via line 148 and diode 150 to a voltage UB, e.g. to +12 V. Capacitor 154, which supplies reactive power back to motors 910 to 916 during operation, is located between node 949 and ground 152.

A Hall sensor for generating a corresponding rotor position signal is associated with each motor. Accordingly, a Hall IC 941 is associated with motor 910, a Hall IC 942 with motor 912, and a Hall IC 946 with motor 916. Hall IC 941 is controlled by the magnetic field of rotor 918, Hall IC 942 by rotor 924, and Hall IC 946 by rotor 936. Hall ICs 941 to 946 are, for example, of the UGN3275K type, and each comprise four terminals 1 to 4. A parallel circuit of terminals 1 of all Hall ICs 941 to 946 is connected via a line 951 to node 949, through which a voltage supply necessary for operation is made available to Hall ICs 941 to 946. Terminals 4 of all Hall ICs 941 to 946 are connected in parallel with one another and to ground 152. Furthermore, terminals 2 on the one hand, and terminals 3 on the other hand, of all Hall ICs 941 to 946 are interconnected in parallel with one another. Terminals 2 and 3 are preferably respectively linked into logical wired AND circuits, as described below with reference to FIG. 10. These wired AND circuits can also be implemented by way of suitable wired OR circuits.

Through terminals 2 of Hall ICs 941 to 946, corresponding rotor signals H1 to HN generated by the ICs are outputted; these signals are combined by the wired AND linkage of terminals 2 into one common signal SIG(1), which assumes a "HIGH" state only when all rotor position signals H1 to HN are "HIGH." Through terminals 3 of Hall ICs 941 to 946, rotor position signals H1 to HN are outputted in negated form, i.e. H1/ to HN/; these signals are combined by the wired AND linkage of terminals 3 into one common signal SIG(−1), which assumes a "HIGH" state only when all the negated rotor position signals H1/ to HN/ are "HIGH," i.e. when all rotor position signals H1 to HN are "LOW."

Common signal SIG(1) is delivered to µC 168 via a line 992 that is connected, via an RC element 994, 996 interconnected to ground 152 for signal smoothing, to terminal 6 (utilized as an input) of µC 168. Common signal SIG(−1) is delivered to µC 168 via a line 980 that is connected, via an RC element 984, 986 interconnected to ground 152 for signal smoothing, to terminal 7 (switched as an input) of µC 168.

During operation, common signals SIG(1) and SIG(−1) are delivered to µC 168 and are preferably processed using an algorithm that corresponds to the flow chart of FIG. 11. For example, when SIG(1)=1 and therefore SIG(−1)=0, MOSFET 158 is switched on and MOSFET 172 is switched off, so that a current flows through winding phases 920, 926, and 938. When SIG(−1) becomes equal to 1, MOSFET 158 is therefore switched off and MOSFET 172 is switched on, so that a current flows through phases 922, 928 and 940.

Thus, during the sensing at Hall ICs 941, 942, 946 of rotor position ranges of rotors 918, 924, 936 that are located, in the case of four-pole rotors 918, 924, 936, e.g. between 0 and 89 degrees and between 180 and 269 degrees and correspond, for example, to North poles, motor current iMOT flows respectively through upper phases 920, 926, and 938. Correspondingly, during the sensing of rotor position ranges that are located, in the case of four-pole rotors 918, 924, 936, e.g. between 90 and 179 degrees and between 270 and 359 degrees and correspond, for example, to South poles, motor current iMOT flows through lower phases 922, 928, and 940, with the result that motors 910, 912 and 916 run synchronously. In this context either the current is switched off when both signals SIG(1) and SIG(−1) have a value of 0, or else commutation occurs only when the subsequent signal SIG(1) or SIG(−1) changes from 0 to 1.

As already mentioned, instead of a parallel connection the phases could, if applicable, also be connected in series or in combined serial and parallel fashion.

The interconnection according to the present invention of the terminals of all Hall ICs 941 to 946, and of windings 920, 922, 926, 928, 938, 940 of all motors 910, 912, 916, thus allows any number of motors to be brought into synchronous operation using a simple microprocessor (e.g. µC 168) having a small number of terminals. It is furthermore also possible to dispense with the use of a microprocessor, since a requisite evaluation of rotor position signals H1 to HN is already accomplished, as described above, by the generation of common signals SIG(1) and SIG(−1) by way of the corresponding wired AND or wired OR linkages.

FIG. 10 shows an example of a simple circuit 1000 with which a wired AND linkage of terminals 2 of all Hall ICs 941 to 946 of FIG. 9 can be achieved. For this, each of Hall ICs 941 to 946 comprises a respective bipolar transistor 1010, 1012, 1016 connected with an open collector, i.e. its emitter terminal E is connected to ground 152, whereas its collector terminal K is connected to line 992. In order to generate the corresponding rotor position signals, base terminal B of each bipolar transistor 1010, 1012, 1016 is connected to further components (not described here in detail for the sake of simplicity) of the corresponding Hall ICs 941 to 946.

To create common signal SIG(1) between line 992 and ground 152, bipolar transistors 1010, 1012, 1016 are equipped with a common collector resistor $R_c$ 1020. This collector resistor (pull-up resistor) 1020 is preferably switched in within µC 168 using software.

The interconnection of open-collector bipolar transistors 1010, 1012, 1016 creates the wired AND linkage described above, in which common signal SIG(1) assumes a "HIGH" value only when all terminals 2 of Hall ICs 941 to 946 are "HIGH." If one or more of terminals 2 go to "LOW," common signal SIG(1) also goes to "LOW."

This type of interconnection via a line (wire) is advantageous because the rotor position signals of the individual motors can easily be connected in parallel with one another. As a result, additional inputs on the microprocessor for each motor are not necessary, and a hardware circuit having additional components for evaluation is also not necessary.

FIG. 11 is a flow chart illustrated a method 1100 according to the present invention for controlling the synchronous running of motors 910, 912, 916. Operation starts at S1102, and in S1104 µC 168 then queries whether SIG(1)=1. If not, in S1106 µC 168 queries whether SIG(−1)=1. If not, in step S1108, for example, upper windings 920, 926, 938 are energized once together, for example within a time span of 100 µs or more, in order to rotate all rotors 918, 924, 926 into approximately the same starting position and thereby to achieve matching values for rotor position signals H1, H2, and HN, so that then either SIG(1)=1 or SIG(−1)=1. Method 1100 then returns to step S1104.

If it is determined, when step S1104 is executed again, that SIG(1)=1, then in S1110 a variable N is set to 1, and method 1100 then continues to step S1120. If, however, SIG(1)=0 and SIG(−1)=1, then after step S1106 is executed again, variable N is set to −1 in step S1112, and method 1100 then continues to step S1120.

In step S1120, µC 168 queries whether SIG(N)=1. If not, the method executes a loop at step S1120 until SIG(N)=1 or until arrangement 900 is switched off. Other routines, for example an alarm routine, can also be executed in the loop. If SIG(N)=1, i.e. the state of the rotor position signals is "all HIGH" for N=1 or "all LOW" for N=−1, windings 920, 922, 926, 928, 938, 940 are energized according to a predetermined energization pattern. For example, upper windings 920, 926, 938 are energized in step S1130 when N=1 and therefore SIG(1)=1. When N=−1 and SIG(−1)=1, for example, lower windings 922, 928, 940 are energized.

After a suitable energization in step S1130, in step S1140 variable N is set to N:=−N, thus ensuring that the next commutation is not performed until all the Hall changes have taken place; and method 1100 returns to step S1120.

Method 1100 thus continuously returns to step S1120, and the operations described above are repeated. Synchronous running of motors 910, 912, 916 is achieved in this fashion with little outlay.

It should be noted that μC 168 is necessary or advantageous principally for executing the startup logic, i.e. steps S1104 to S1108 as described above, and/or for performing suitable actions in the event of a fault, i.e. if SIG(N) is continuously zero, for example because one or more of motors 910, 912, 916 is stalled. In this case, μC 168 is preferably configured at least to generate the alarm signal as described with reference to FIG. 9, and/or to stop arrangement 900. Otherwise, as has already been explained above, the use of μC 168 is not absolutely necessary.

Figure 12:
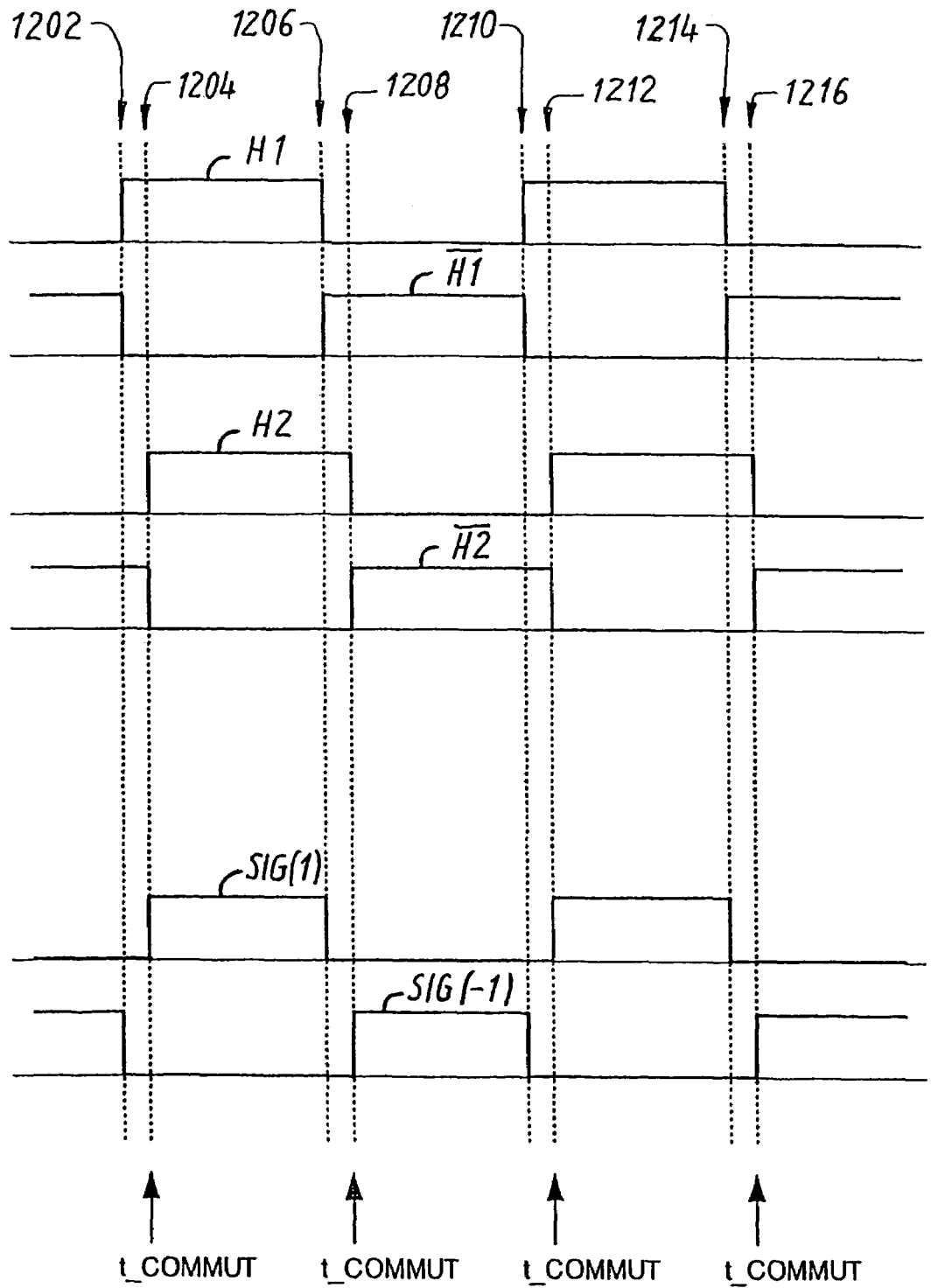
FIG. 12 is a schematic depiction to explain the manner of operation of the invention.

FIG. 12 is an example of a sequence diagram of method 1100 of FIG. 11, in which, for simplification, only rotor position signals H1 and H2 and their negated forms H1/ and H2/ are depicted.

FIG. 12 thus describes a simplified commutation that serves only to generate synchronized running of motors 910 and 912.

As described in FIG. 11, the current in all motors 910, 912, 916 is simultaneously commutated upon the occurrence of a predetermined state of signal SIG(1) or SIG(-1), for example when SIG(1) or SIG(-1) is "HIGH." According to a preferred embodiment of the invention, this predetermined state occurs whenever all rotors 918, 924, 936 have executed a predetermined pole change, i.e. from North to South pole or from South to North pole.

As is evident from FIG. 12, at a time 1202 a change in rotor position signal H1 from "LOW" to "HIGH" takes place as a result of a corresponding pole change of rotor 918, e.g. from North to South pole. The corresponding pole change does not occur in rotor 924 until time 1204, at which a change in H2 from "LOW" to "HIGH" thus occurs. At time 1206 the next pole change of rotor 918 occurs, this time e.g. from a South back to a North pole, so that H1 changes from "HIGH" back to "LOW." The corresponding change in H2 does not occur, for example, until time 1208. Further pole changes are indicated at times 1210, 1212, 1214, and 1216.

Because H1 and H2 are "HIGH" only between times 1204 and 1206, and 1212 and 1214, common signal SIG(1) generated from the two of them is also "HIGH" only between those times. Common signal SIG(1) thus causes a commutation of the current in motors 910, 912 at each commutation time t_COMMUT, corresponding to times 1204 and 1212.

The determination of common signal SIG(-1) is based on a combination of the negated rotor position signals H1/ and H2/, and is accomplished by analogy with what was described above. This also applies to the evaluation of this signal with regard to commutation of the motor current.

Many further variants and modifications are of course possible, within the scope of the present invention. In the exemplifying embodiments, for example, open- or closed-loop speed control can be provided by influencing the speed of the motors by way of the operating voltage +UB as control output.

What is claimed is:

1. A method of controlling synchronous running of a plurality of electronically commutated motors (22, 24, 26; 110, 112, 114, 116) that each comprise:
a stator having at least one stator winding (40, 42, 44; 120, 122; 126, 128; 132, 134; 138, 140)
a permanent-magnet rotor (28, 30, 32; 118, 124, 130, 136), and
at least one arrangement, associated with the respective motor, for sensing the rotor position thereof and for generating a rotor position signal (H1, H2, H3, H4), and having
an energization arrangement (46; 158, 172) to which the stator windings of the motors are connected,
comprising the steps of:
detecting occurrence of a predetermined state of respective rotor position signals (H1, H2, H3, H4) of said motors, namely a change associated with passing a pole, from a first rotor position signal value to a second rotor position signal value, and
subsequent to said change of said signal value in each of said motors, commutating the current in all the motors simultaneously.

2. The method according to claim 1, wherein
the predetermined state is defined by the fact that each rotor has a rotor position within a predetermined rotor position range.

3. The method according to claim 2, wherein the predetermined rotor position range corresponds, for each motor, approximately to one pole width of the respective permanent-magnet rotor.

4. The method according to claim 2, wherein said detecting of said predetermined state comprises
detecting that all the arrangements for sensing the rotor position are generating the same predetermined rotor position signal.

5. The method according to claim 1, further comprising the step of
combining the rotor position signals (H1, H2, H3, H4) into one common signal (SIG(1), SIG(-1)), and wherein
the predetermined state is defined by the fact that the common signal (SIG(1), SIG(-1)) has a predetermined value.

6. The method according to claim 1, further comprising the step of
evaluating the rotor position signals (H1, H2, H3, H4) at least partially in a microprocessor.

7. The method according to claim 1, wherein
all the motors are of the same type, and the predetermined state is defined by the fact that the rotor position signals (H1, H2, H3, H4) have the same value.

8. An arrangement having a plurality of electronically commutated motors (22, 24, 26; 110, 112, 114, 116) that each comprise:
a stator having a stator winding (40, 42, 44; 120, 122, 126, 128, 132, 134, 138, 140),
a permanent-magnet rotor (28, 30, 32; 118, 124, 130, 136), and at least one arrangement, associated with the respective motor, for sensing the rotor position thereof and for generating a corresponding rotor position signal (H1, H2, H3, H4), and
an energization arrangement (46; 158, 172) to which the stator windings of the motors ate connected, the energization arrangement (46; 158, 172) being implemented to perform the steps of:
detecting occurrence of a predetermined state of the rotor position signals (H1, H2, H3, H4), and
commutating the current in all the motors simultaneously, and wherein
at least one of said electronically commutated motors (112, 114) has a stator with a plurality of phases (126, 128), and a permanent-magnet rotor (124) which induces, during its rotation, a voltage in said plurality of winding phases (126, 128), the induced voltage being suitable, by differentiation, for generating, during a currentless condition of the motor, a differentiated voltage that is usable for generation of a rotor position signal.

9. The arrangement according to claim 8, wherein the predetermined state is defined by the fact that all the rotors have a rotor position in a predetermined rotor position range.

10. The arrangement according to claim 9, wherein the predetermined rotor position range corresponds, for each motor, approximately to one pole width of the respective permanent-magnet rotor.

11. The arrangement according to claim 8, wherein the predetermined state is defined by a predetermined rotor position signal generated by all the arrangements for sensing the rotor position.

12. The arrangement according to claim 8, further comprising
an arrangement for linking the rotor position signals (H1, H2, H3, H4), which arrangement is configured to generate one common signal (SIG(1), SIG(−1)), a predetermined value of the common signal (SIG(1), SIG(−1)) defining the predetermined state.

13. The arrangement according to claim 8, further comprising
a microprocessor for at least partial evaluation of the rotor position signals (H1, H2, H3, H4).

14. The arrangement according to claim 8, wherein
the rotor position signals are signals that are derived by sampling signal values in the individual motor windings (126, 128, 132, 134) according to the sensorless principle.

15. The arrangement according to claim 14, wherein
the individual windings (126, 128, 132, 134) of the motors (112, 114) are at least partially decoupled from one another.

16. The arrangement according to claim 15, wherein
a respective diode (220, 222, 224, 226) is provided in each corresponding supply lead to individual windings (126, 128, 132, 132) of the motors (112, 114).

17. The arrangement according to claim 15, wherein
the individual windings (126, 128, 132, 134) of the motors (112, 114) are decoupled by the delivery of current to each winding through a separate semiconductor switch (250, 252, 254, 256).

18. The arrangement according to claim 8, further comprising
an arrangement for filtering a signal generated by the differentiation, prior to evaluation of the differentiated signal.

* * * * *